Figure 1:
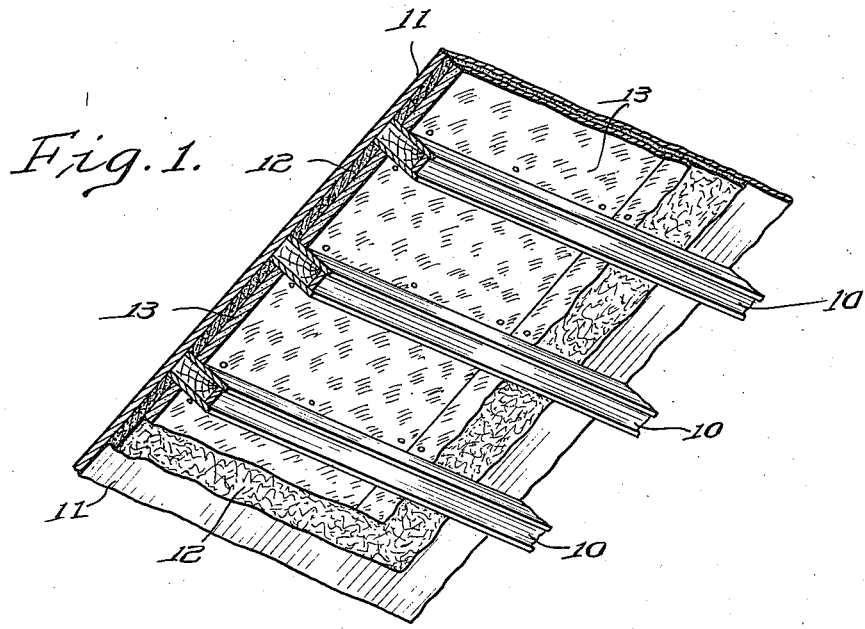

Dec. 7, 1926.

M. C. ROSENBLATT

ACOUSTICS

Filed June 8, 1926

1,609,311

INVENTOR
Maurice C. Rosenblatt.
BY Frank H. Borden
ATTORNEY

WITNESS
F. J. Hartman.

Patented Dec. 7, 1926.

1,609,311

UNITED STATES PATENT OFFICE.

MAURICE C. ROSENBLATT, OF PHILADELPHIA, PENNSYLVANIA.

ACOUSTICS.

Application filed June 8, 1926. Serial No. 114,588.

This invention relates to acoustics, pertaining particularly to devices which not only absorb sonorous vibrations, but also damp out uncontrollable vibrations produced by the action of sound upon parts considered for acoustic treatment.

Certain of the problems of the acoustic treatment of buildings are made more difficult by the fact that certain areas of the surfaces of the hall, auditorium, etc., respond to different sonorous vibrations or sets of vibrations, that is to varying frequencies or wave lengths of sound. Because of this co-vibrations are produced which cannot be predetermined nor controlled. These co-vibrations reinforce, amplify, or distort the sound which impinges upon the surface, and in the case of complex sounds modify the sounds by reinforcing or distorting certain components of the complex sound, such as certain overtones.

Where this co-vibration or resonance exists, inasmuch as it cannot be predetermined during the design of the building, or controlled during construction, it is desirable to eliminate it entirely, especially in a situation where acoustical treatment is necessary to reduce reverberation, or to correct any other acoustical defect.

If one attempted to analyze this detrimental resonance for any particular area of the surface of a room, etc., which may possibly co-vibrate with the source of sound, one might write the equation of vibration of the area thus:

$$M\frac{d^2s}{dt^2} + F \times \frac{ds}{dt} + Cs = 0$$

Where M is the mass, F, the frictional force, C is the elasticity, and $s$ is displacement from the position of equilibrium. If the frequency of the co-vibrating part is fixed and is $$\frac{(C/M)^{\frac{1}{2}}}{2\pi}$$

then the maximum amplitude of the part, if various frequencies make up the sounding source, will occur when a sound is received for which $$p = \left\{\left(\frac{C}{M}\right)^2 - \frac{2F}{M}\right\}^{\frac{1}{2}}$$

where $p$ equals maximum amplitude. If there are a series of such co-vibrating parts of various frequencies and a sound of $$\frac{p\pi}{2}$$

frequency, is received, then the maximum amplitude will occur on the co-vibrating part in which, $$p = \left(\frac{C}{M}\right)^{\frac{1}{2}}$$

It is therefore evident that the resonance defined by the above terms is indeterminate because for practical reasons all of the functions of the above formulæ and terms are indeterminate, none of the variables being known nor obtainable on practical working materials that go to make up the interior of a building.

Since resonance is but rarely advantageous in the adjustment of acoustics in an auditorium, and since uncontrolled resonance is always harmful where other acoustic defects are in existence that are about to be corrected, it is entirely wise, as previously noted, to eliminate resonance entirely, so that the acoustic problem may be predetermined.

There are a number of porous cellular artificial boards formed of waste and other materials that have utility in the absorption of sound waves impinging thereagainst. One such board such as insulite has an absorption factor of .31. That is, it absorbs almost one third of the energy of the sound waves incident upon it. Attempts have been made to use such boards for acoustic treatments, by placing sections thereof against the areas to be acoustically treated. Although the results should, seemingly, be satisfactory, yet frequently they are not. The reason being, that though the board is fairly rigid and but slightly flexible, and has a desirable factor of absorption, yet it may respond to an unknown pitch or particular sonorous vibration, and give out co-vibrations or resonance of itself, and further when imposed upon a given area, it may transmit a vibration to the surface behind it, due to the wave lengths of sound incident upon it and the entire structure, whereby a disadvantageous co-vibration of both the surface or area and the superimposed board as a unit is set up.

Among the objects of this invention are; to provide an acoustic treatment of high efficiency; to provide an acoustic treatment effective without regard to the unknown responsiveness of the area to be treated; to provide an acoustic treatment in which the ratio of absorption is high with no enhancement of the vibratory responsiveness of the treated area or surface; to provide an acoustic material which has a high factor of absorption and also a high efficiency in damping vibrations; to provide an acoustic material susceptible of easy and economical attachment to a surface to be treated; to provide an acoustic material that simultaneously absorbs an appreciable percentage of the energy of the sound waves impinging against it and which also dampens the co-vibrations or resonance of the surface against it which it is imposed; to provide an improved acoustic treatment and material which increases the net working efficiency of the whole; to provide an acoustic treatment of high efficiency in sound-proofing; and many other objects and advantages as will be more apparent as the description proceeds.

Figure 2:
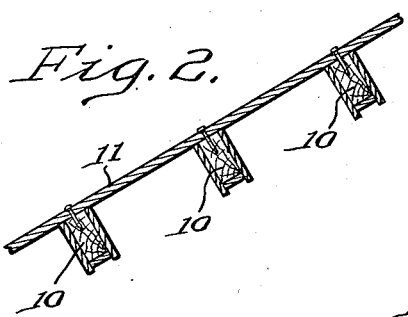
Figure 4:
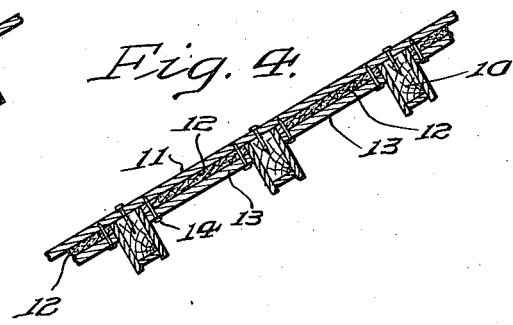
Figure 3:
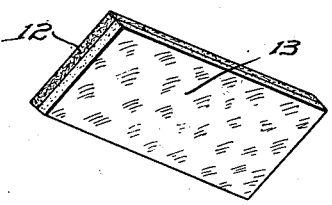

In the accompanying drawings:

Fig. 1, is a fragmentary perspective view of a portion of a building to be acoustically treated, Fig. 2, is a section therethrough, Fig. 3, is a perspective view of a section of the acoustic treatment according to the preferred form of the invention, and Fig. 4, is a section similar to Fig. 2, with the acoustic material in its operative position relative the surface or area to be treated.

Of the many acoustic defects which may exist in any building or portion thereof, such as, excess of reverberation, discreet echo, interference, loudness—deficiency and resonance—resonance is the only factor which cannot be predetermined, it being impossible under working conditions to tell what any given area will be responsive to, that is, the pitch, wave length or sets of waves of sonorous vibrations that will set up or stimulate co-vibration and resonance in the area cannot be predetermined. As noted the co-vibration may be either a reinforcement, a distortion or a modification of the particular sonorous vibration to which the area is responsive, and when uncontrolled, as it almost always is, it is highly undesirable.

Referring now to the drawings, a typical area for acoustic treatment is disclosed in Fig. 1, in which a section of roof is disclosed, having for instance, beams 10 and sheathing 11, the area considered for treatment. Obviously this disclosure is purely illustrative and not limitative as there are many portions of structures that would serve for illustration equally well. The area 11 has an unknown, or, possibly, a non-existent vibratory rate, or responsiveness. When a section of artificial board such as will later be described is imposed upon area 11, it is found that quite independent of the sound absorptive coefficient of the board, it is probable that the area and such board will co-vibrate in response to some unknown sonorous vibration or set of vibrations, with a resultant detrimental distortion or modification of the sound, calling for relief if the building or portion thereof is to be used for its intended purpose.

Although as is well known there are many forms of acoustic treatments, and the choice of materials is affected by the factors of the problem, but wherever possible, such artificial board has been used heretofore despite its unreliable nature and the frequent and known instances of its inefficiency, because it merges well with the architectural scheme, is rather easily worked, as it is susceptible to sawing and carpentering to fit, and, of great importance, the relatively hard, though porous surface, is one that is easy to decorate. In numerous cases due to ignorance of the problem involved, and of the solution thereof involved in this invention, an entire surfacing of artificial board of this character originally installed in hope of its success, because of its sound absorptive property, and its pleasing appearance and decoratable nature, has been torn out and replaced with another treatment of possibly greater efficiency, but of greatly inferior esthetic effectiveness. This latter consideration is a vital one in numerous cases.

According to this invention, an artificial board 13, usually formed of waste cellular material, having a relatively hard finish, although porous throughout, and forming a relatively cheap insulating sheathing for various purposes, is provided. This is not laid directly upon the area 11, as in the previous practice, but is spaced therefrom by a layer 12, of some compressible, resilient fibrous material, such as felt. The board section 13, and the fibrous spacer 12 may be associated in any desired manner as by tacking or gluing to the under surface of the board a desired thickness of felt, etc., or by applying the fibrous spacing layer 12 directly to the area 11, and then superimposing the board section 13 upon the spacing layer.

In any case the assembly comprises the area 11, a layer or strips of spacing fibrous material 12, and the external exposed board section 13. The assembly may be held in place in any desired manner, such for instance, as by nails 14, and in the assembled position the layer of felt, etc., is slightly compacted.

The finished, assembled unit, when applied, has an easily workable, relatively hard finish, which lends itself to the architectural or decorative scheme. Although in its assembly it is rather simple and can be economically applied, it is uniformly successful, and the application of the damping layer of fibrous material forms a step in an acoustic treatment of great and practical value.

It is believed that the advantages and novelty of the invention will be obvious.

I claim as my invention:

1. The combination with a surface of undetermined vibratory responsiveness, of a flat imperforate decoratable potentially vibratory and sound absorbing layer of cellular material in juxtaposition thereto, of a layer of resilient fibrous material in intimate and bearing relation between said surface and said layer whereby vibrations in either the layer or the surface are damped and co-vibration of either layer or surface is precluded.

2. The combination with a surface of potential vibratory responsiveness to be acoustically treated, of a layer of cellular yielding but relatively stiff material having a potential vibratory responsiveness and a relatively high co-efficient of sound absorption in juxtaposition to said surface and a layer of yielding material between the surface and said layer precluding undesired vibration of either the surface or the layer.

3. As an article of manufacture, arranged for association with a surface of potential vibratory responsiveness, a layer of cellular, porous but imperforate material having a high co-efficient of sound absorption, and a damping layer of yielding material in contact with the layer to preclude vibration thereof.

4. An acoustic material including a layer of cellular yielding, flat surfaced semi-rigid material possessed of potential vibratory responsiveness and a relatively high coefficient of sound absorption, and a sheet of vibration damping material associated therewith.

In testimony whereof, I affix my signature.

MAURICE C. ROSENBLATT.